E. D. BROBST, Jr.
ANIMAL HITCHING AND RELEASING DEVICE.
APPLICATION FILED JAN. 26, 1916.
1,199,151.  Patented Sept. 26, 1916.
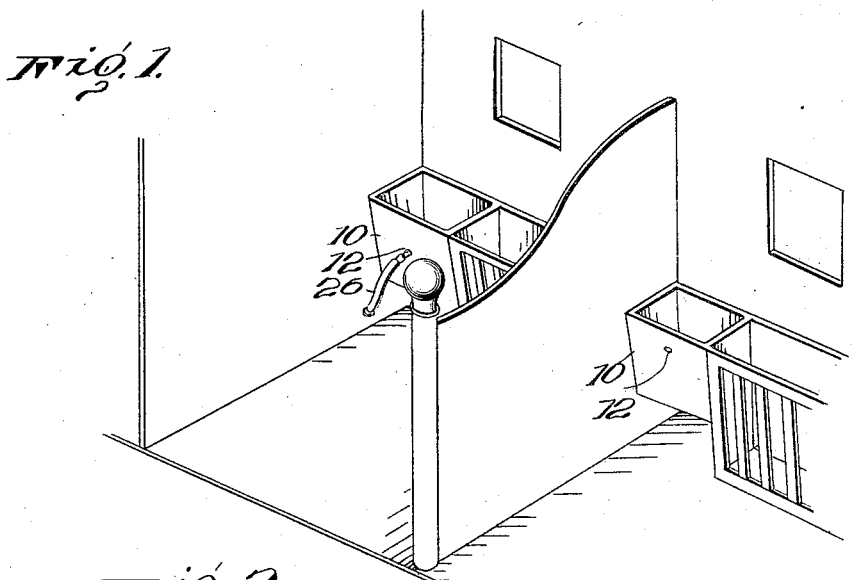
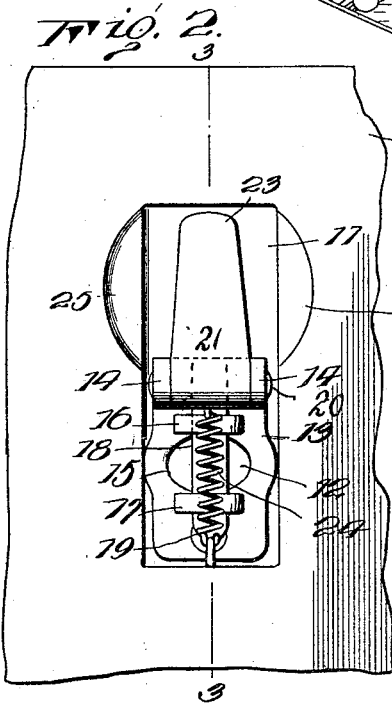
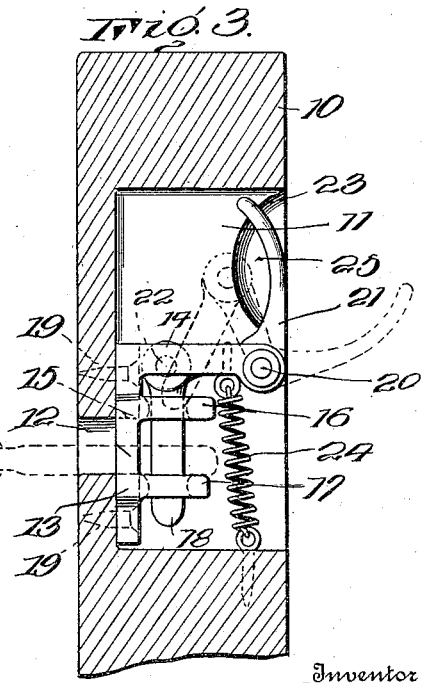
Inventor
E. D. Brobst, Jr.

UNITED STATES PATENT OFFICE.

EDWARD D. BROBST, JR., OF BLOOMSBURG, PENNSYLVANIA.

ANIMAL HITCHING AND RELEASING DEVICE.

1,199,151.  Specification of Letters Patent.  Patented Sept. 26, 1916.

Application filed January 26, 1916. Serial No. 74,411.

*To all whom it may concern:*

Be it known that I, EDWARD D. BROBST, Jr., a citizen of the United States, residing at Bloomsburg, in the county of Columbia and State of Pennsylvania, have invented certain new and useful Improvements in Animal Hitching and Releasing Devices, of which the following is a specification.

This invention relates to devices for hitching animals to mangers or like structures, and has for one of its objects to provide a simply constructed device whereby the animal is safely hitched to the manger while at the same time readily released when required.

Another object of the invention is to provide a hitching device which is protected from access by the animal, but which is readily accessible manually when the animal is to be released.

With these and other objects in view, the invention consists in certain novel features of construction as hereinafter shown and described, and then specifically pointed out in the claim and in the drawings illustrative of the preferred embodiment of the invention, Figure 1 is a perspective view of portions of the stalls in a stable or barn illustrating the appearance of the exteriors of the mangers to which the improved device is attached; Fig. 2 is an enlarged detail view of a portion of the interior of the manger with the improvement attached thereto; Fig. 3 is a section on the line 3—3 of Fig. 2.

Corresponding and like parts are referred to in the following description and indicated in all the views of the drawings by the same reference characters.

The manger, represented conventionally at 10, includes a front member and formed in the rear face of the front member is a relatively long inwardly opening recess 11 and formed through the front 10 is a relatively small opening or aperture 12 which communicates with the recess, as illustrated in Fig. 3.

By reference to Fig. 1 it will be noted that the only portion of the improved device which appears from the front is the relatively small aperture 12. Secured within the recess 11 and against its inner wall is a support including a vertical portion 13 and laterally or rearwardly extending ears 14. The body 13 is formed with an opening, represented at 15, conforming in size and shape with the opening 12 and registering with the same. Extending inwardly from the body 13 of the support are guide lugs 16—17 and slidably disposed through these lugs is a holding pin 18. The opening for the pin 18 in the lug 16 is preferably elongated, as indicated by dotted lines in Fig. 3, to enable the pin to be elevated, as hereafter explained. The body portion 13 of the support is secured to the manger by screws or other suitable fastening devices, indicated at 19. Pivoted at 20 between the ears 14 is a bell-crank lever member, represented as a whole at 21, with one arm pivoted at 22 to the upper end of the pin 18 and the other arm extended into a finger grip portion 23, the latter being preferably curved, as represented in Fig. 3. A spring 24 is connected to the lever member 21 and operates to hold the pin yieldably in its downward position, as illustrated in Fig. 3. Preferably the sides of the recess 11 adjacent to the portion 23 of the lever are cut out, as indicated at 25, to enable the fingers of the operator to be more readily applied to the portion 23 of the lever when the latter is to be actuated. The halter member, a portion of which is represented conventionally at 26 in Fig. 1, is provided with a loop device of a size adapted to pass through the apertures 12 and 15 and engage the pin 18. Thus when the animal is to be hitched the operator actuates the lever 23 by the fingers to elevate the pin against the resistance of the spring 24 to enable the loop member to be inserted, and then by releasing the lever the spring automatically returns the pin to its former position and passing it through the loop and thus completing the hitching action.

It will be noted that the link holding mechanism is entirely concealed within the recess 11, so that it will be impossible for the animal by any manipulation by which it is capable to actuate the lever and release the link, while at the same time the link may be readily actuated manually by the operator when required.

Having thus described the invention, what is claimed as new is:—

The combination with a manger having an inwardly opening recess and a contracted aperture communicating with the recess, of a support within said recess having spaced guide lugs and laterally directed ears, a pin mounted for movement between said ears and through said guide lugs and in position to be engaged by a looped member when passed through the contracted opening, and a lever device pivoted between said ears and to said pin and wholly concealed within said recess when the pin is in holding position.

In testimony whereof I affix my signature.

EDWARD D. BROBST, JR. [L. S.]